May 25, 1926.
P. R. C. WINANS
1,586,275
VULCANIZING BLOCK
Filed March 4, 1924
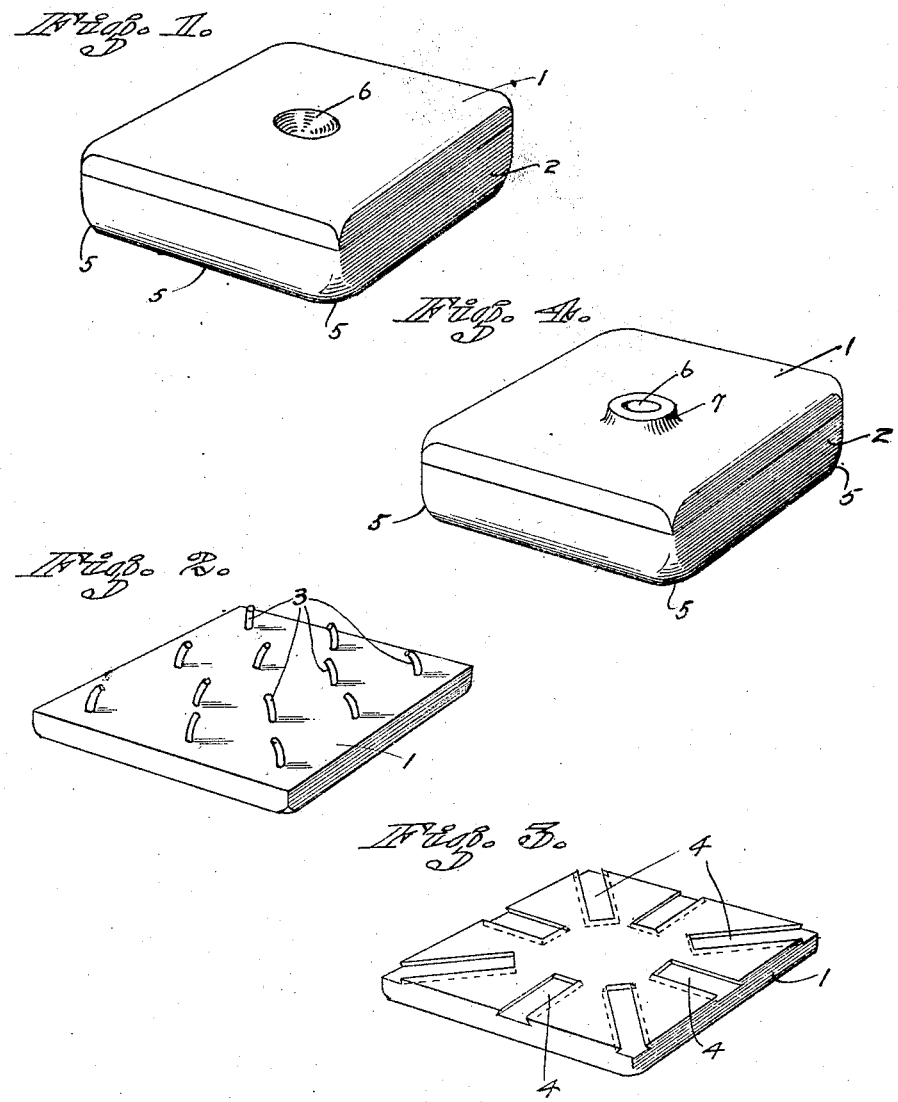
Invento
PAUL R.C. WINANS
Attorneys Patented May 25, 1926.

1,586,275

UNITED STATES PATENT OFFICE.

PAUL R. C. WINANS, OF FULLERTON, CALIFORNIA.

VULCANIZING BLOCK.

Application filed March 4, 1924. Serial No. 696,826.

This invention relates to the vulcanizing of repair patches on rubber goods generally, especially to such repairs on the inner tubes of pneumatic tires, and it has to do particularly to the specific construction of the pressure applying block or pad.

The objects of my invention are to provide a pressure block or pad for this work which will combine several features such as simplicity and cheapness to manufacture, durability in locking the pad to the backing, means for centering the pressure applying device, and a pad formation adapted to cause a better flow of the repair gum, and also to avoid marks on the repaired work.

I attain the above objects in the vulcanizing block illustrated in the accompanying drawings and in which:

Figure 1 is a perspective view of my complete block, Figures 2 and 3 are views of the backing plate only showing the under side with the pad retaining devices on its surface, and Figure 4 shows an optional boss arrangement for centering the pressure on the back of the plate.

The drawings may be considered full size for one size of the device, though it is to be made in all sizes to meet any patch requirement.

Essentially my invention comprises a metal backing plate (1) having a heavy elastic pad (2) of rubber vulcanized to one side and retained by suitable devices to prevent it stripping from the plate through creeping action when the pressure is applied.

The devices employed may be hooked projections (3) as shown in Figure 2 or radial locking projections or grooves (4) as shown in Figure 3, or a combination of both. The pad (2) is vulcanized to the plate and is of an elastic quality of rubber so that it will yield to the patch and cause the repair gum to flow evenly and form a feather edge to the patch.

In thus yielding to the pressure it naturally spreads laterally from the center of the pressure and if the locking devices are arranged radially as shown in Figure 3 it will never leave the plate even if its vulcanized attachment to the plate should become impaired.

The pad is well rounded at all outer edges and corners as shown at (5) thus avoiding the usual marking of the tire in using, and the rear of the plate is provided with a pressure centering device such as the depression (6) either made in the flat plate or elevated on a little boss (7) to better distribute the pressure of whatever pressure applying screw or device is used to force it against the tire being repaired. The tire of course will occupy a position between the pad and the usual steam table with the patch against the table.

I am aware of earlier pads of this nature but they have lacked the essential features of a perfect device in not being vulcanized to the backing, having no retaining means at the inner surface of the pad, no means of centering the pressure to get an even flow, no means of preventing marks on the tire, and usually had a rim which interfered with the proper spreading of the pad, and it is to the improved features which I claim invention as follows.

I claim:

1. A vulcanizing block comprising a rigid backing plate with an elastic pad on one side thereof and radially disposed retainers on the plate engaging the pad.

2. A vulcanizing block comprising a flat metal backing plate with a centralized depression in one side and an elastic rubber pad vulcanized to the other side, said pad having rounded outer corners and edges and the plate having projections extending into the rubber pad arranged in a manner to permit a radial movement of the rubber from a central point under the depression.

PAUL R. C. WINANS.